(12) United States Patent
Ramanath et al.

(10) Patent No.: US 7,477,778 B2
(45) Date of Patent: Jan. 13, 2009

(54) SEQUENTIAL COLOR REPRODUCTION METHOD

(75) Inventors: Rajeev Ramanath, Plano, TX (US); Donald B. Doherty, Richardson, TX (US); Gregory S. Pettitt, Farmersville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 44 days.

(21) Appl. No.: 11/616,170

(22) Filed: Dec. 26, 2006

(65) Prior Publication Data

US 2008/0152219 A1    Jun. 26, 2008

(51) Int. Cl.
*G06K 9/00*    (2006.01)
*G09G 5/02*    (2006.01)
(52) U.S. Cl. ..................... 382/162; 345/604
(58) Field of Classification Search ......... 382/162–167, 382/254, 260, 274–276, 304, 307, 312; 358/512, 358/515–524; 348/27–280; 345/589, 590, 345/593, 603, 604, 613; 353/31, 39, 47, 353/49
See application file for complete search history.

(56) References Cited

U.S. PATENT DOCUMENTS

| | | | | |
|---|---|---|---|---|
| 5,929,843 A * | 7/1999 | Tanioka | ...................... | 345/600 |
| 6,335,734 B1 * | 1/2002 | Nagae et al. | ................ | 345/589 |
| 6,529,291 B1 * | 3/2003 | Schweid et al. | .............. | 358/1.9 |
| 6,536,904 B2 * | 3/2003 | Kunzman | ..................... | 353/31 |
| 6,552,495 B1 * | 4/2003 | Chang | ..................... | 315/169.3 |
| 6,876,764 B2 * | 4/2005 | Lee et al. | .................... | 382/162 |
| 2006/0214945 A1 | 9/2006 | Nitta | | |

* cited by examiner

*Primary Examiner*—Kanji Patel
(74) *Attorney, Agent, or Firm*—Wade J. Brady, III; Frederick J. Telecky, Jr.

(57) ABSTRACT

An improved color processing method for use in imaging systems transforms the input color image components into an output set of color image components, at least one of which is transformed using a non-linear transformation function.

34 Claims, 5 Drawing Sheets

SEQUENTIAL COLOR REPRODUCTION METHOD

TECHNICAL FIELD

The technical field of the examples to be disclosed in the following sections relates to the art of imaging systems and more particularly to the art of color processing in imaging systems.

BACKGROUND

Various techniques for producing images exist. For example, an imaging system may use an image engine having an array of individually addressable pixels, such as reflective and deflectable micromirrors, reflective and movable membranes (e.g. IMOD), liquid-crystal cells (LCDs), liquid-crystal-on-silicon cells (LCOS), or emissive cells (e.g. plasma cells). The imaging systems further may incorporate a passive display screen or an active display screen.

These imaging systems may cause objectionable artifacts in produced images. One of the leading artifacts in these imaging systems, especially in sequential color imaging systems, is color separation artifact, which is also called color breakup. The color separation artifact is perceived as multiple color images during pursuit and saccadic eye movements. This artifact is most prevalent in a scene containing high contrast spatial transitions such as scrolling white text on a black background.

Moreover, different imaging systems may have different color spaces or different combinations of primary colors for producing color images. These color spaces and combinations of primary colors may not be the same as the color space or the combination of primary colors of the image source. For example, an image to be projected using a specific imaging system may use red, green, and blue primary colors; whereas the specific imaging system uses an array of pixels with each pixel being composed of red, green, blue, and a fourth color, such as yellow. It is clear that displaying the image with the pixels having a different color combination than that of the input image without proper color processing will cause inferior images.

SUMMARY

In an example, a method for processing an image is disclosed. The method comprises: upon receiving an image having a first set of color image components of a first group of colors, deriving a second set of color image components of a second group of colors; wherein the second group of colors comprises an additional color that is not in the first group of colors; and wherein the derivation of an image component of said additional color involves a non-linear transformation.

In another example, an imaging system is disclosed herein. The system comprises: an image processor having an input for receiving an input image to be reproduced, wherein the image processor further comprises: deriving means for, upon receiving an image having a first set of color image components of a first group of colors, deriving a second set of color image components of a second group of colors; wherein the second group of colors comprises an additional color that is not in the first group of colors; and wherein the derivation of an image component of said additional color involves a non-linear transformation; and an image engine having an array of pixels for reproducing the input image based on a set of image data derived from the second set of color image components.

In yet another example, an imaging system for reproducing an input image is disclosed herein. The method comprises: an image processor having an input for receiving an input image to be reproduced, wherein the image processor further comprises: an input for receiving a set of color components of the input image; a first transformation module for obtaining an intermediate value from the set of color components; a non-linear filter in connection with first transformation module for transforming an output of the first transformation module using a non-linear function; a set of subtraction nodes and multiplexers connected to the inputs of the first transformation module and the output of the non-linear filter for obtaining a transformed set of color image components; and an outputs for outputting the transformed set of color image components; an image engine having an array of pixels for reproducing the input image based on a set of image data derived from the transformed set of color image components.

In still yet another example, a device for processing an image is disclosed herein. The method comprises: an input for receiving a set of color components of the input image; a first transformation module for obtaining an intermediate value from the set of color components; a non-linear filter in connection with first transformation module for transforming the intermediate value using a non-linear function; a set of subtraction nodes connected to the inputs of the first transformation module and the output of the non-linear filter for subtracting a value proportional to the non-linearly transformed value from each individual input color image component; and a set of outputs for outputting a set of transformed color image components having the subtracted color image components.

DETAILED DESCRIPTION OF SELECTED EXAMPLES

Figure 1:
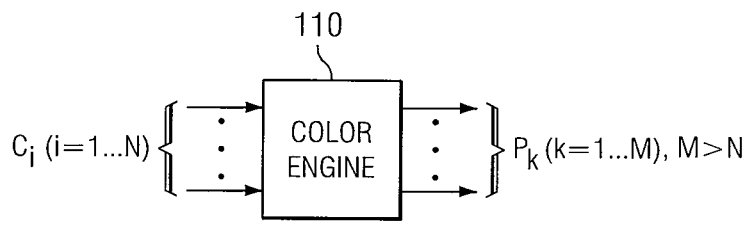
FIG. 1 is a block diagram illustrating a color engine.

An improved color management method and an imaging system using the same will be disclosed in the following sections. The color management method transforms a set of primary color image components of an input image into another set of color image components commensurate with the imaging system used for producing the input image, wherein at least one of said another set of color image components is transformed with a non-linear transformation function. After the transformation, intensities of (or energies carried by) the primary color image components of the input image are re-distributed among the transformed set of primary color image components.

In a sequential imaging system an additional color channel (e.g. a white color channel) different from the primary color of the input image can be introduced; and such additional color can be determined based on the color that is associated with the potential sequential color separation artifact in the produced color image. By re-distributing intensities (or energies) of the primary color components in the input image among the transformed set of primary color components including the additional color image component, the sequential color separation artifact can be eliminated or reduced. For example, in a black-and-white image wherein the color separation artifact is most perceivable by human eyes, and when the additional color is white, color image components of the produced image have reduced or minimum amount of intensities (or energies); whereas the white color image component of the produced image has enhanced intensity (or energy)—thereby, significantly reducing the color separation artifact in the produced white-and-black image. The same applies for other images than black-and-white, in which instance, the additional colors may be other colors than white.

The intensity or energy re-distribution can be accomplished by calculating the additional color component of the image to be re-produced using a non-linear transfer function; and reducing intensities (or energies) of other primary color components accordingly. The calculation of the additional color component can be based on the tolerance of the human eyes to the sequential color artifact.

The improved color management method is applicable to a variety of imaging systems including digital and analog imaging systems. The improved color management method is also applicable in imaging applications other than display. The imaging systems can be front projector and rear projection TV. The imaging systems can be systems employing an image engine having an array of individually addressable pixels, such as reflective and deflectable micromirrors, reflective and movable membranes (e.g. IMOD), liquid-crystal cells (LCDs), liquid-crystal-on-silicon cells (LCOS), or emissive cells (e.g. plasma cells). The imaging systems further may incorporate a passive display screen or an active display screen. The improved color management method is also applicable to imaging systems that use a spatially tessellated pattern of sub-pixels either in the form of red-green-blue triplets along with an achromatic sub-pixel, which may render an achromatic color on screen either using only the achromatic sub-pixel, or a desired combination of the other colored sub-pixels as well for enhanced reproduction of highlights and added brightness for white. Furthermore, The improved color management method may also be used solely or in combination with not just an achromatic sub-pixel or segment but also with sub-pixels or segments of other colors.

Referring to the drawings, FIG. 1 schematically illustrates a color engine. Color engine 110 has multiple inputs for receiving an input image having a set of color image components $\{C_i\}$ (i=1 to N), wherein N is an integer equal to the total number of primary color image components of the input image. For example, the input color set $\{C_i\}$ may comprise red, green, and blue colors, or other colors such as YCbCr, YPbPr, and YUV.

The input set of color image components $\{C_i\}$ is transformed into a set of output color image components $\{P_k\}$ (k=1 to M), wherein M is the total number of transformed primary color image components with M being greater than N. One or more additional color components not included in the input set $\{C_i\}$ are generated by the color engine. Such transformation can be expressed as:

$$\{P_k\} = f_t(\{C_i\}), \text{ wherein } k=[1,M], i=[1,N], \text{ and } M > N \qquad \text{(Eq. 1)}$$

$f_t$ is a transfer function, which can be linear or non-linear functions. An exemplary non-linear form of function $f_t$ is $\text{Min}(X_i)$, which finds the minimum value of the set of variables $X_i$. Another exemplary linear form of function $f_t$ can be:

$$f_t(x_i) = \sum_{i=1}^{N} \eta_i x_i \qquad \text{(Eq. 2)}$$

wherein $\eta_i$ is a set of coefficients; and $x_i$ are variants.

In an example, the transformed set $\{P_k\}$ has all colors of the input color image components $\{C_i\}$; and the additional color of the additional color image component is a linear combination of additive colors of the input color image components. For example, input color set $\{C_i\}$ can be a set comprising $C_1$=red image component, $C_2$=green image component, and $C_3$=blue image component. After the transformation, the output color set $\{P_i\}$ can be a set comprising $P_1$=red image component, $P_2$=green image component, $P_3$=blue image component, and $P_4$=white image component. In other examples, $P_i$ can be any desired color combinations depending upon the input color set. For example, the output color set can comprise colors that are selected from red, green, blue, cyan, magenta, and yellow and white. It is noted that even though "white color" has different specifications in different video and display applications or standards, the "white" in the context is not limited to any specific white point in a specific standard. Instead, the "white" can be any "white point" specified in current video and monitor systems. For example, the "white" in this disclosure can be a color when used as a segment of a spinning color wheel, the white segment still filters the incident light—that is, the exit (filtered) light from the white segment has a spectrum that is different from the spectrum of the incident light.

Intensities of or energies carried by the input color image components $\{C_i\}$ are re-distributed among the output color image components $\{P_k\}$. Specifically, the intensity of (or the energy carried by) the out additional color component is allotted from the input color image components; and intensities of the input color components are reduced. Accordingly, other output color image components having the same colors as the input color image components have less intensities and energies than the input color image components. As an aspect of this example, the transformation of at least one additional color image component includes a non-linear transfer function.

For example, the input image comprises red, green, and blue image components with amplitudes of Red=255, Green=20, and Blue=10 in an 8-bit color representation. By selecting $f_t$ as the minimum value of the input color image components; the non-linear transfer function as a power law; and the additional color as white, the output set may comprise red, green, blue, and the additional color white, with values of red=254.9706, green=19.9706, blue=9.9706, and white=0.0294. In this example, the white color is the linear combination of red, green, and blue colors of substantially the same amount; while the amplitude is obtained through a non-linear power law transfer function, which will be discussed more afterwards.

In the above example as shown in FIG. 1, the input and output of the color engine are parallel such that the input color image components can be delivered to the color engine in parallel; and the output transformed color image components can be output in parallel. In other alternative examples, the input and/or the output of the color engine can be serial, which is not shown in the figure.

Figure 2:
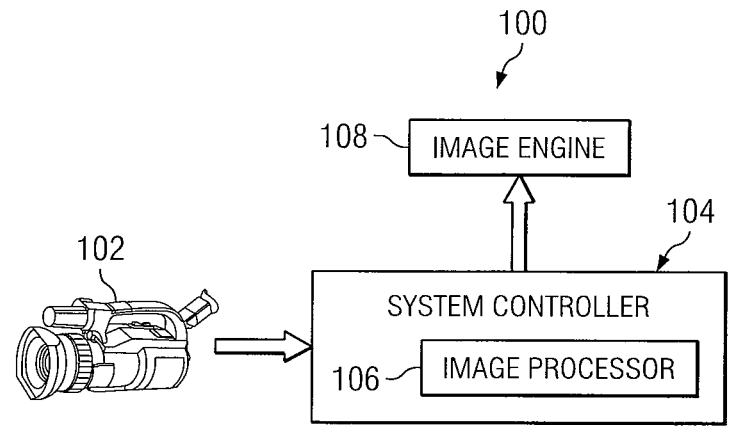
FIG. 2 schematically illustrates an exemplary imaging system.

The improved color management method has a variety of applications, one of which is in imaging systems. An exemplary such imaging system is schematically illustrated in FIG. 2. Referring to FIG. 2, imaging system 100 comprises image engine 108 that is designated to produce images using image data derived from desired images. Image engine may comprise an array of individually addressable pixels, such as reflective and deflectable micromirrors, reflective and movable membranes (e.g. IMOD), liquid-crystal cells (LCDs), liquid-crystal-on-silicon cells (LCOS), or emissive cells (e.g. plasma cells). The image engine also may comprise a spatially tessellated pattern of sub-pixels either in the form of red-green-blue triplets along with an achromatic sub-pixel, which may render an achromatic color on screen either using only the achromatic sub-pixel, or a desired combination of the other colored sub-pixels as well for enhanced reproduction of highlights and added brightness for white.

The image data used by the image engine for generating the desired image is prepared by image processor 106 of system controller 104 as shown in FIG. 2. Specifically, the image processor retrieves (or receives) input image signals from image source 102, which may or may not be a member of the imaging system; and processes the input image signals accordingly; and transforms the processed image signals into proper format, such as bitplane data format, that can be used by the image engine. The system controller is designated to control and synchronize operations of the functional members of the imaging system. The image processor is a device in which examples of the improved color management method can be implemented. In particular, the image processor comprises the color engine 110 as discussed above with reference to FIG. 1.

Figure 3:
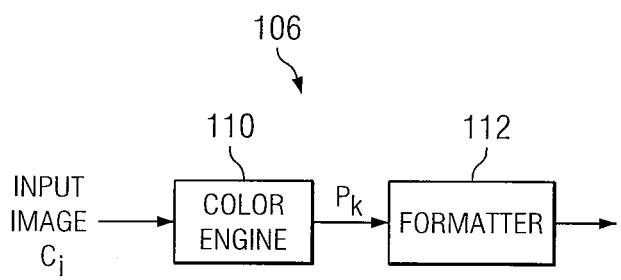
FIG. 3 is a diagram illustrating an exemplary image processor in the imaging system of FIG. 1, wherein the image processor comprises a color engine of FIG. 1.

As an example, FIG. 3 schematically illustrates a structure of image processor 106 in FIG. 2. Referring to FIG. 3, image processor 106 comprises color engine 110 and data formatter that transforms the image data from one format to the proper data format that can be directly used by the image engine, For example, the data formatter is capable of transforming pixel-by-pixel data (pixel data) into bitplane-by-bitplane data (bitplane data). In an operation, the input image signals $\{C_i\}$ is transformed by color engine 110 into transformed image signals $\{P_k\}$ that is further formatted by the data formatter into bitplane data.

Figure 4:
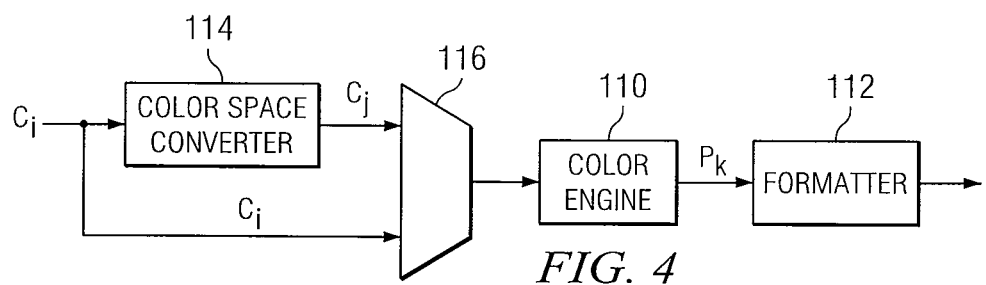
FIG. 4 is a diagram illustrating another exemplary image processor in the imaging system of FIG. 1, wherein the image processor comprises a color engine of FIG. 1.

Another exemplary image processor is schematically illustrated in FIG. 4. Referring to FIG. 4, the image processor comprises color space converter 114, color multiplexer 116, color engine 110, and data formatter 112.

The color space converter (114) is designated for mapping the color space of the input images into the color space of the imaging system (100 in FIG. 2). Color multiplexer 116 outputs color image components based on the input image and the output of the color space converter (114). The processed image signals are delivered to color engine 110 that processes the color image, which will be discussed in the following. The processed color image from color engine 110 can then be delivered to data formatter 112 that formats the image data to proper format, such as bitplane data that can be directly used by the image engine. In other alternative configurations, other functional modules, such as a de-gamma module can be provided, for example between the color multiplexer and data formatter.

The color engine (110) transforms the input color image components into a new set of color image components as discussed above. This operation will be discussed in the following with particular examples wherein the input color image components have red, green, and blue colors and the output color image components comprise red, green, blue, and an additional color—white. It will be appreciated by those skilled in the art that the following discussion is for demonstration purpose, and should not be interpreted as a limitation. Other variations without departing from the spirit of the invention are also applicable. For example, the input color image components can be any color combinations, the color of each preferably selected from red, green, blue, cyan, magenta, yellow, and white. The transformed color image components also may comprise different color combinations. The generated additional color is not necessarily one white color, instead, can be any other colors or any other number of different colors.

Figure 5:
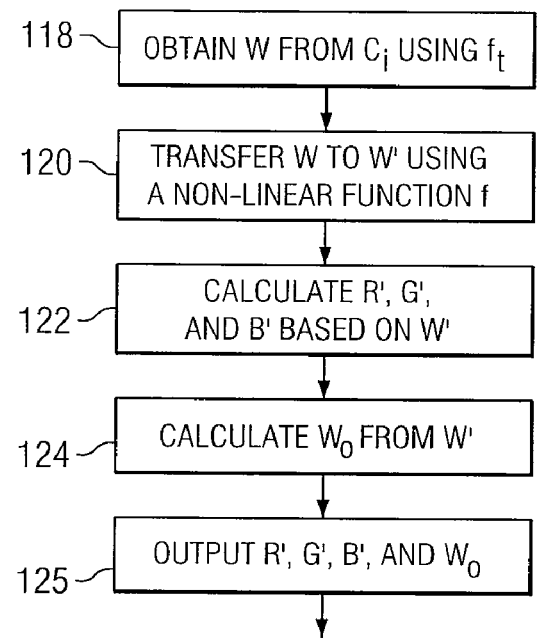
FIG. 5 is a flow chart showing the steps executed for calculating an additional color component other than the primary color components in the input image.
Figure 7:
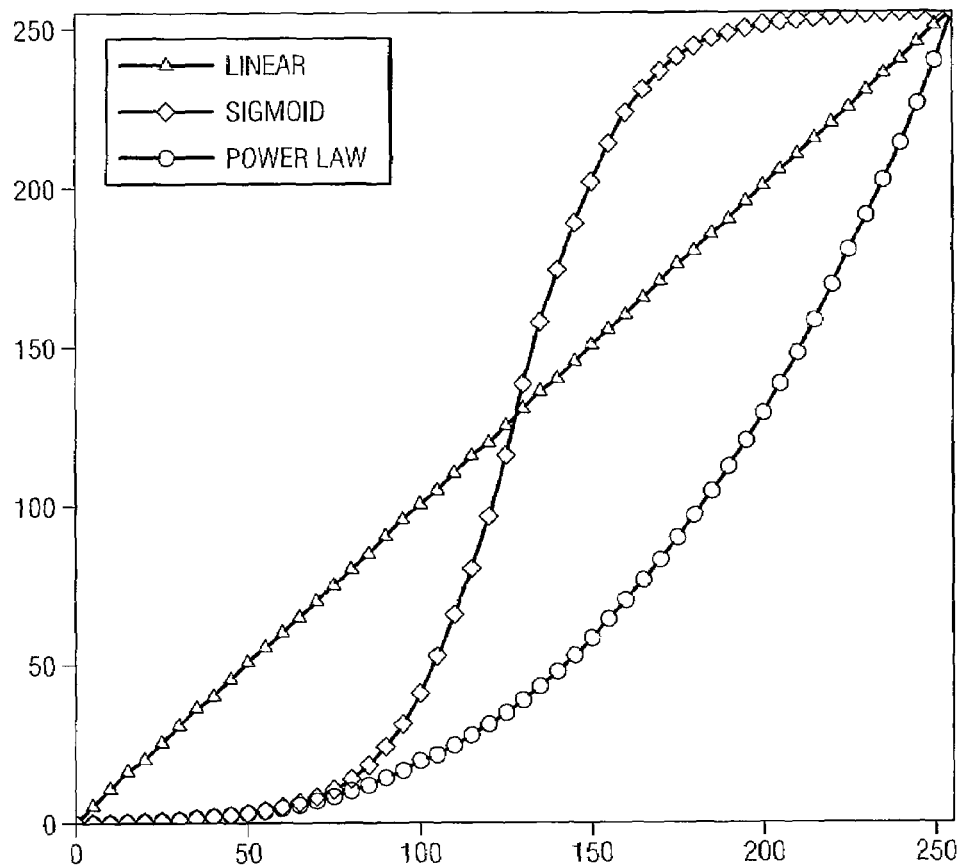
FIG. 7 shows a set of exemplary non-linear transfer functions that can be used in determining the additional color component and a set of primary color components for producing images.

Referring to FIG. 5, an intermediate value W is calculated from input $C_i$ that comprises red, green, and blue by transfer function $f_t$. For example, $f_t$ is the minimum operation of the input variants, W then is the minimum value of the input R (red), G (green), and B (blue) signals (step 118). The minimum value W is then transferred to W' using a non-linear transfer function $f$ (step 120). FIG. 7 presents three exemplary non-linear transfer functions that can be used in the improved color management method. Of course, other non-linear functions are also applicable, such as the following equations:

$$W' = \tau \times \left(\frac{W}{255}\right)^\gamma \quad \text{(Eq. 3)}$$

$$W' = \frac{255}{[1 + e^{-(\tau \times (W-\zeta))}]}$$

wherein $\tau$ and $\zeta$ are variables.

The transformed W' is then subtracted from the R, G, and B, values to obtain new primary color values of R', G', and B' (step 122) as expressed in the following.

$$W'' = f(W) = f[f_t(R,G,B)] = f[\text{Min}(R,G,B)]$$

$$R' = R - W'$$

$$G' = G - W'$$

$$B' = B - W'$$

As a way of example, the input image has a pixel value of R=255, G=20, and B=10. W is set to 30, which is the minimum of R, G, and B. Using a power-law function as shown in FIG. 7, W' can be calculated as 0.0294; and R', G', and B' can be calculated as R'=254.9706, G'=19.9706, and B'=9.9706. The calculated W', R', G', and B' are then used to independently drive the four color channels in the display operation. In the above exemplary process, the relatively saturated color (R=255, G=20, and B=10) does not get its minimum (B=10) component removed and transferred to the white channel, as in the instance when the transfer function is linear. Instead, the relatively saturated colors are not de-saturated by the white component, which enables imaging systems wherein white data is used to display only the white signal and colors near white, which significantly reduces sequential color artifacts, such as the color separation artifact.

Figure 6:
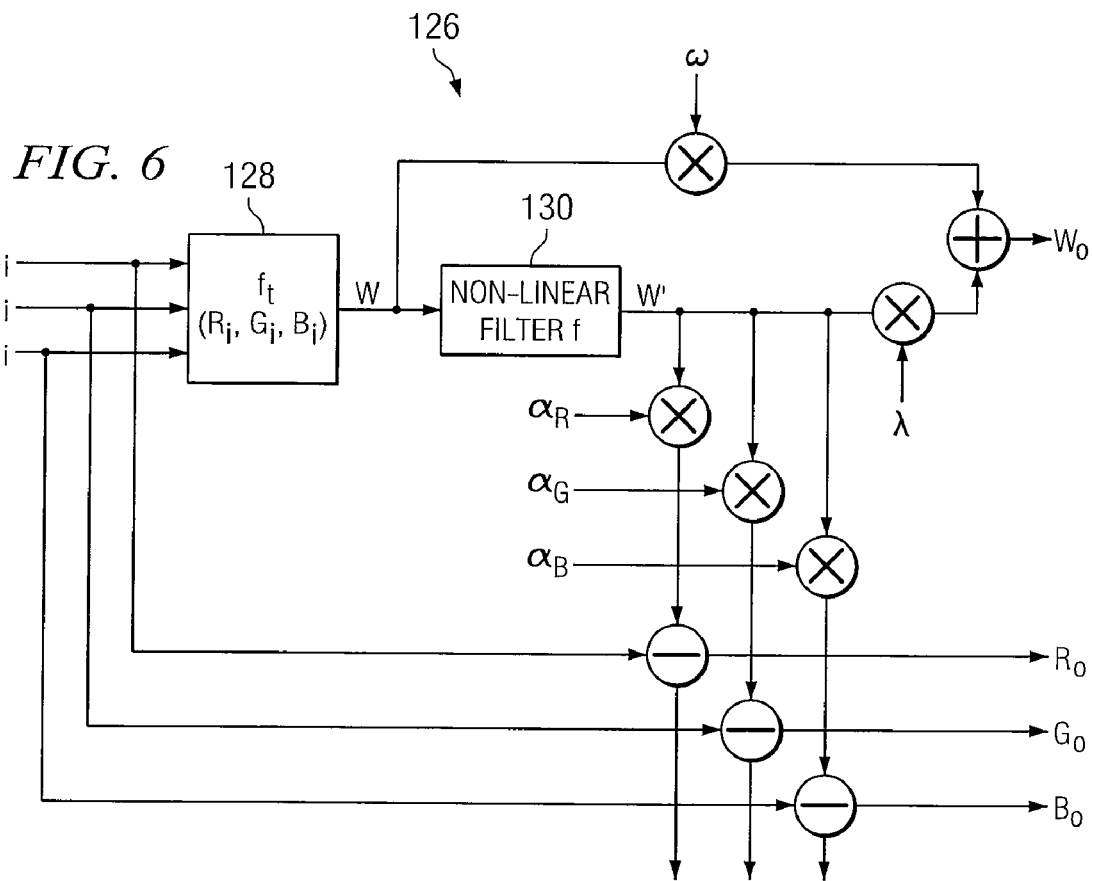
FIG. 6 diagrammatically illustrates a device for processing images.

The above method can be implemented as a software module having computer-executable instructions; and the software can be stored in a computer-readable medium. Alternatively, the above method can be implemented in an electronic circuit device that can be included in the color engine as discussed above with reference to FIG. 1. An exemplary electronic circuit is shown in FIG. 6. The electronic circuit can be Field-programmable-gate-arrays (FPGA) or ASIC.

Referring to FIG. 6, device 126 comprises multiple inputs for receiving primary color components $\{C_i\}$, such as $R_i$, $G_i$, and $B_i$. Though the inputs are parallel as shown in the figure, the inputs can alternatively be serial, which is not shown in the figure. Transformation module $f_t$ 128 is connected to the inputs and is designated to transform the input color image components into an intermediate value W. For example, $f_t$ can be the minimum operation, and the intermediate vale W is then the minimum value of the input color image components. The output W of the $f_t$ function module is connected to the input of the non-linear filter $f$ 130 that transfers the input signal W into a transferred new value W'. In this example, the new value W' is output, for example, to other functional modules, such as de-gamma module for further processing.

The calculated W' is fed into multipliers and multiplied by coefficients $\alpha_R$, $\alpha_G$, and $\alpha_B$; and the products are respectively delivered to subtract nodes respectively connected to the input $R_i$, $G_i$, and $B_i$ signals to generate outputs $R_o$, $G_o$, and $B_o$. The output $W_o$, such as output white component, is obtained as a sum of W multiplied by coefficient $\omega$ and W' multiplied by coefficient $\lambda$. The mathematical equation is presented as follows:

$$W'=f(W)=f[f_t(R_i,G_i,B_i)]=f[\text{Min}(R_i,G_i,B_i)]$$

$$W_o=\omega \times W+\lambda \times W'=\omega \times \text{Min}(R_i,G_i,B_i)+\lambda \times f[\text{Min}(R_i,G_i,B_i)]$$

$$R_o'=R_i-\alpha_R \times W'$$

$$G_o'=G_i-\alpha_G \times W'$$

$$B_o'=B_i-\alpha_B \times W'$$

Coefficients $\alpha_R$, $\alpha_G$, and $\alpha_B$ are used to control the amount of deduction from individual primary colors. These coefficients can also be assigned as the color correction factors for correcting the difference the "white color" defined by the white segment of the color filter and the "white color" generated by the combination of other primary color segments in the color filter. When the difference is substantially zero or below a predetermined threshold, the coefficients $\alpha_R$, $\alpha_G$, and $\alpha_B$ all can be 1.0. Otherwise, the coefficients can be used to individually adjusting the primary color levels, in which instance, $\alpha_R$, $\alpha_G$, and $\alpha_B$ may or may not be the same, but preferably between 0 and 1 inclusive. Coefficients $\omega$ and $\lambda$ are predetermined and preferably dynamically adjustable coefficients, which can be 1.

In another example, a 3-dimensional Look-Up-Table (LUT) can be used along with the improved color management method. In this example, primary color inputs (e.g. three primary colors of red, green, and blue) yield primary color outputs and a white color. This configuration with 3D LUT enables precise control of W'. For example, W can be assigned to the minimum value of input primary colors, such as R, G, and B; and R', G', and B' can be calculated as a result of the application of the non-linear function, which is then subtracted from the input primary color values of R, G, and B. This in turn, enables modification of white-only-white imaging systems wherein white is composed of a variable amount of R, G, and B to be dialed into the W' component so as to create a brighter white than a white-only-white system. In other words, portions of the R, G, and B components can be trickled into the white component to generate enhanced full-on brightness. The portions of R, G, and B trickled into the white component can be dynamically adjusted based upon the tolerance of human perception to the sequential color artifacts. Exemplary functions usable for determining the amount of portions are listed below:

$$W' = \tau \times \left(\frac{\text{input}}{255}\right)^\gamma \qquad \text{(Eq. 4)}$$

$$W' = \frac{255}{[1+e^{-(\tau \times (\text{input}-\zeta))}]}$$

wherein $\tau$ and $\zeta$ are variables with $\tau$ being assigned to control the amount of white component contributed by the input (R, G, and B.), and the input is anyone of R, G, and B.

Figure 8:
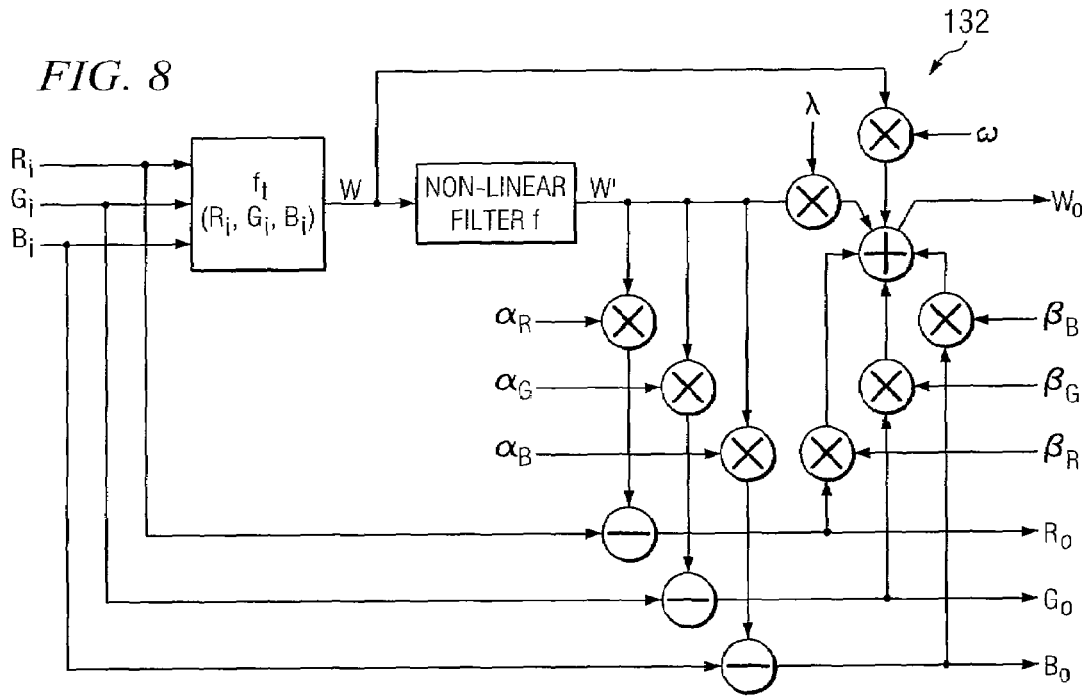
FIG. 8 diagrammatically illustrates another device for processing images.

The above method can be implemented as a software module having computer-executable instructions; and the software can be stored in a computer-readable medium. Alternatively, the above method can be implemented in an electronic circuit device that can be included as a member of the color engine 110 as discussed above with reference to FIG. 1. The electronic circuit is schematically illustrated in FIG. 8. The electronic circuit can be Field-programmable-gate-arrays (FPGA) or ASIC.

Referring to FIG. 8, device 132 comprises multiple inputs for receiving primary color components, such as $R_i$, $G_i$, and $B_i$. Though the inputs are parallel as shown in the figure, the inputs can alternatively be serial, which is not shown in the figure. The $f_t$ transformation function module, which can be a Min function, is connected to the inputs and is designated to obtain the minimum value of the inputs. The output W of the min function module is connected to the input of the non-linear filter f that transfers the input signal W into a transferred new value W'.

The calculated W' is fed into multipliers and multiplied by coefficients $\alpha_R$, $\alpha_G$, and $\alpha_B$; and the products are respectively delivered to subtract nodes respectively connected to the input $R_i$, $G_i$, and $B_i$ signals to generate outputs $R_o$, $G_o$, and $B_o$, The mathematical equation is presented as follows:

$$W'=f(W)=f[f_t(R_i,G_i,B_i)]=f[\text{Min}(R_i,G_i,B_i)]$$

$$R_o'=R_i-\alpha_R \times W'$$

$$G_o'=G_i-\alpha_G \times W'$$

$$B_o'=B_i-\alpha_B \times W'$$

Coefficients $\alpha_R$, $\alpha_G$, and $\alpha_B$ are used to control the amount of deduction from individual primary colors. These coefficients can also be assigned as the color correction factors for correcting the difference the "white color" defined by the white segment of the color filter and the "white color" generated by the combination of other color segments in the color filter.

The calculated $R_o$, $G_o$, and $B_o$ are delivered to multiple multipliers and respectively multiplied by coefficients of $\beta_R$, $\beta_G$, and $\beta_B$. The products are input to an adder to be added with the calculated W' multiplied by coefficient $\lambda$ and W multiplied by coefficient $\omega$. The summation is then output as the white signal $W_o$. A mathematical expression is shown in the following:

$$W' = f(W) = f[f_t(R_i, G_i, B_i)] = f[\mathrm{Min}(R_i, G_i, B_i)]$$

$$R_o = R_i - \alpha_R \times W'$$

$$G_o = G_i - \alpha_G \times W'$$

$$B_o = B_i - \alpha_B \times W'$$

$$W_o = \lambda \times W' + \omega \times W + [\beta_R \times (R_i - \alpha_R \times W') + \beta_G \times (G_i - \alpha_G \times W') + \beta_B \times (B_i - \alpha_B \times W')]$$

Figure 9:
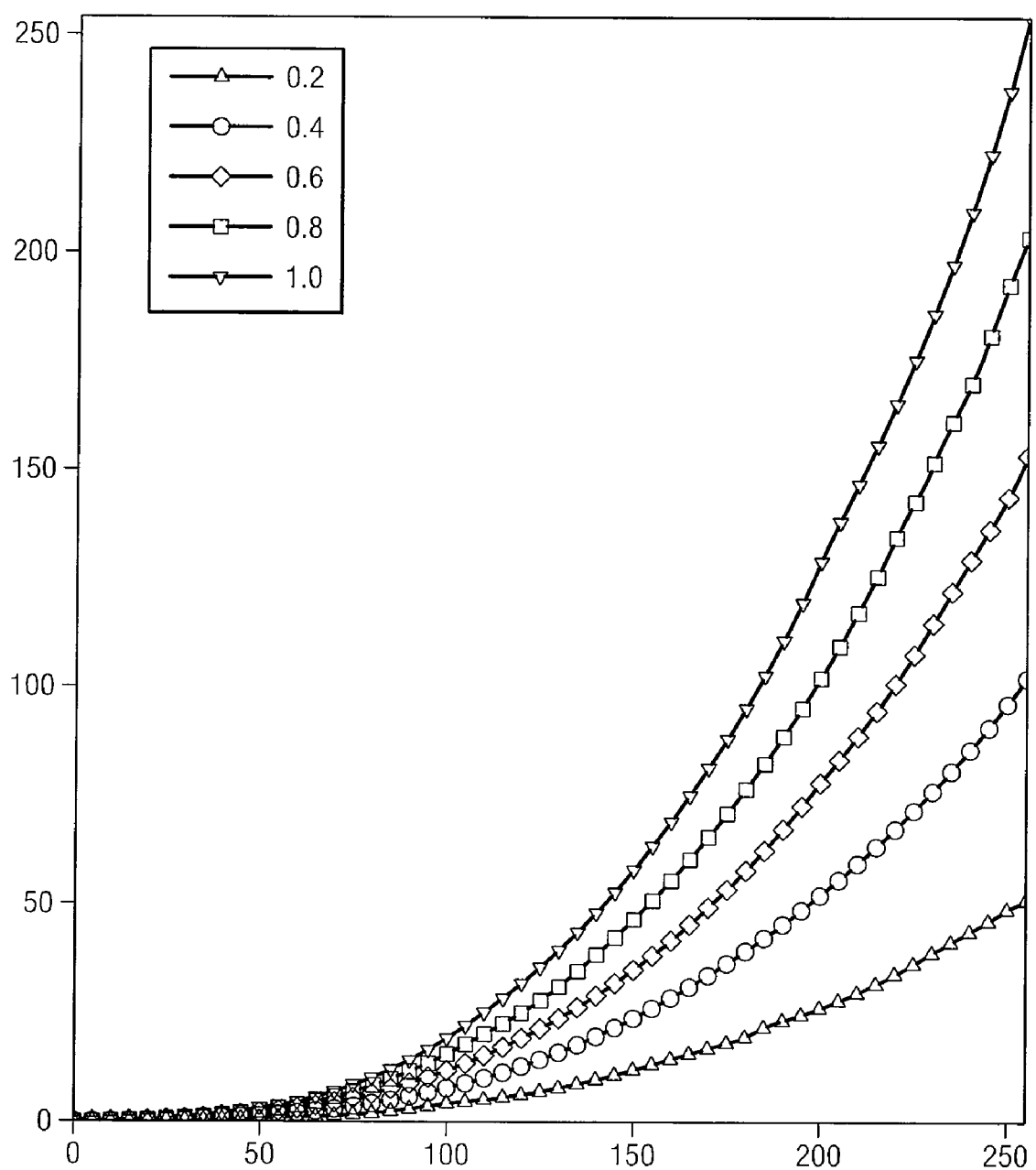
FIG. 9 shows the (R, G, B) vs. white in full-on white reproduced images, wherein the white components are generated using a power law transfer function with different powers.

FIG. 9 shows the (R, G, B) vs. white in a full-on white reproduced image with the white being generated by the low-law function in equation 2 with different power $\gamma$. As can be seen in FIG. 8, W' equals 255; and R', G', and B' are 51 when showing full-on white with the curve noted with $\gamma=0.2$. When using the curve noted as $\gamma=1$, the full-on white is W' equals 255; and R', G', and B' are 255. It is clear that the white generate using the curve noted with $\gamma=0.2$ has better sequential color artifact reduction efficiency than that generated using the curve noted with $\gamma=1$, which is a linear transfer function. In an example, the power $\gamma$ is preferably less than 1, and more preferably less than 0.8.

The improved color management method can be implemented in imaging systems. In particular, it can be implemented in sequential color imaging systems with reduced or eliminated sequential color artifacts appeared in most current sequential color imaging systems. As an example, FIG. 10 schematically illustrates a sequential color imaging system employing a spinning color wheel.

Figure 10:
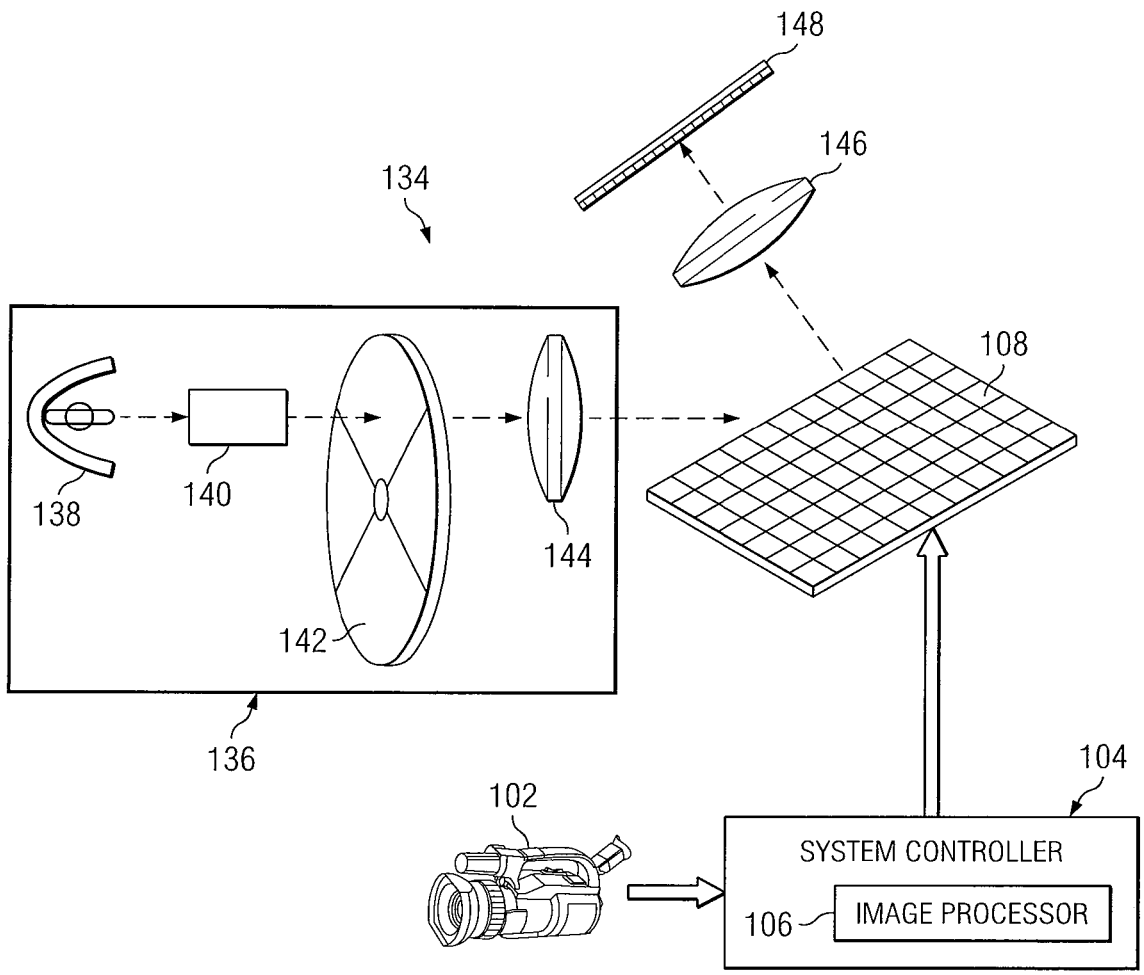
FIG. 10 schematically illustrates an exemplary sequential color imaging system.

Referring to FIG. 10, imaging system 134 comprises illumination system 136 for providing illumination light, image engine 110 that modulates the incident light based on image data so as to reproduce the desired image, projection lens 146 that projects the modulated light onto screen 108 for viewing. The illumination system further comprises light source 138 that can be an arc lamp or other light sources capable of emitting light, such as lasers and LEDs, light integrator 140, color wheel 142, and condensing lens 144. The image engine comprises an array of individually addressable pixels of any suitable forms. For example, the pixels can be reflective and deflectable micromirrors, LCD cells, LCOS cells, and other suitable devices.

The image data used by the display is derived from input images from image source 102 by image processor 106 of system controller 104. The system controller is designated to control and synchronize operations of the functional members of the imaging system. Color wheel 142 comprises a set of primary colors and a white segment, as shown in FIG. 11.

Figure 11:
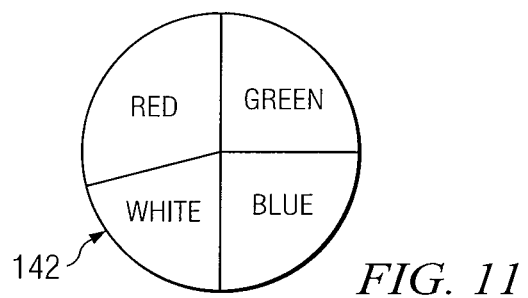
FIG. 11 schematically illustrates an exemplary color wheel having a white segment and a set of primary colors of red, green, and blue for use in the sequential imaging system as shown in FIG. 10.

Referring to FIG. 11, the primary colors in this particular example comprises red, green, and blue, along with the white segment. Each color segment may have any suitable angles. For example, the red, green, blue, and white segments may respectively have 120, 90, 90, and 60 degree angles. It is noted that FIG. 11 shows only one of many possible examples. In other examples, the primary colors of red, green, and blue may not in the order as shown in FIG. 11. Moreover, the color wheel may have other primary color combinations with the primary colors preferably selected from, red, green, blue, cyan, magenta, and yellow. In addition to the primary colors of red, green, and blue, the additional color or colors may be other colors than white.

It will be appreciated by those of skill in the art that a new and useful color processing method for use in imaging systems has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method for processing an image, comprising:
    upon receiving an image having a first set of color image components of a first group of colors, deriving a second set of color image components of a second group of colors;
    wherein the second group of colors comprises an additional color that is not in the first group of colors;
    wherein the derivation of an image component of said additional color involves a non-linear transformation; and
    wherein the derivation of an image component of said additional color involves more than one linear transformation applied to each component of the first set of color image components.

2. The method of claim 1, wherein the other color image components in the second group are derived from the color image components in the first group and said additional color image component in the second group.

3. The method of claim 2, wherein an energy distribution of the second set of color components in the image is different from that of the first set of color components in the image.

4. The method of claim 2, wherein the second color group has all colors in the first color group.

5. The method of claim 4, wherein the first color group comprises red, green, and blue colors; and the second color group comprises red, green, blue, and white color.

6. The method of claim 3, wherein the additional color component is generated from a procedure that comprises:
    obtaining an intermediate value from the first set of color components;
    applying the non-linear function to the obtained intermediate value so as to obtain a transformed intermediate value; and
    setting the additional color component equal to the transformed intermediate value.

7. The method of claim 6, wherein the intermediate value is the minimum value of the first set of color components.

8. The method of claim 7, further comprising:
    subtracting the transformed intermediate value from each color component of the first set so as to obtain the color components of the second set.

9. The method of claim 6, wherein the non-linear function is a power-law function with a power less than 0.8.

10. An imaging system for reproducing an input image, comprising:

an image processor having an input for receiving an input image to be reproduced, wherein the image processor further comprises:
  an input for receiving a set of color components of the input image;
  a first transformation module for obtaining an intermediate value from the set of color components;
  a non-linear filter in connection with first transformation module for transforming an output of the first transformation module using a non-linear function;
  a set of subtraction nodes and multiplexers connected to the inputs of the first transformation module and the output of the non-linear filter for obtaining a transformed set of color image components;
  one or more linear filters that are connected to an output of the non-linear filter, an output of the first transformation module, and an output of the set of subtraction nodes for transforming an output of the first transformation module; and
  an output for outputting the transformed set of color image components;
an image engine having an array of pixels for reproducing the input image based on a set of image data derived from the transformed set of color image components.

11. The system of claim 10, wherein the image processor is a FPGA electronic circuit or an ASIC electronic circuit.

12. The system of claim 10, wherein the imaging system is a front projector, a rear projector, or a rear projection TV.

13. The system of claim 10, further comprising:
  an illumination system for illuminating the image engine with light.

14. The system of claim 13, wherein the illumination system comprises:
  a light source providing the light;
  a color wheel for generating a set of color light; and
  a condensing lens for directing the set of color light onto the image engine.

15. The system of claim 14, wherein the color wheel comprises a set of segments of colors selected from red, green, blue, cyan, magenta, blue, and white.

16. The system of claim 14, wherein the light source comprises an arc lamp, a laser or a LED.

17. The system of claim 14, wherein the non-linear function is a power law function with a power less than 0.8.

18. The system of claim 17, further comprising:
  an adder that is connected to an output of the non-linear filter and an output of the first transformation module.

19. The system of claim 18, wherein the adder has an output for a transformed white color image component.

20. An imaging system for reproducing an input image, comprising:
  an image processor having an input for receiving an input image to be reproduced, wherein the image processor further comprises;
    an input for receiving a set of color components of the input image;
    a first transformation module for obtaining an intermediate value from the set of color components;
    a non-linear filter in connection with first transformation module for transforming an output of the first transformation module using a non-linear function;
    a set of subtraction nodes and multiplexers connected to the inputs of the first transformation module and the output of the non-linear filter for obtaining a transformed set of color image components;
    an adder that is connected to an output of the non-linear filter and an output of the first transformation module; and
    an output for outputting the transformed set of color image components;
    wherein the non-linear function is a power law function with a power less than 0.8;
  an image engine having an array of pixels for reproducing the input image based on a set of image data derived from the transformed set of color image components;
  an illumination system for illuminating the image engine with light, comprising:
    a light source providing the light;
    a color wheel for generating a set of color light; and
    a condensing lens for directing the set of color light onto the image engine.

21. The system of claim 20, wherein the adder has an output for a transformed white color image component.

22. The system of claim 20, wherein the adder is connected to an output of the set of subtraction nodes and multiplexers.

23. A device for processing an image, comprising:
  an input for receiving a set of color components of the input image;
  a first transformation module for obtaining an intermediate value from the set of color components;
  a non-linear filter in connection with first transformation module for transforming the intermediate value using a non-linear function;
  a set of subtraction nodes connected to the inputs of the first transformation module and the output of the non-linear filter for subtracting a value proportional to the non-linearly transformed value from each individual input color image component;
  one or more linear filters that are connected to an output of the non-linear filter, an output of the first transformation module, and an output of the set of subtraction nodes; and
  a set of outputs for outputting a set of transformed color image components having the subtracted color image components.

24. The device of claim 23, wherein the set of transformed color image components comprises an additional color image component that is different from any one of the input color image components.

25. The device of claim 24, wherein the additional color image component is an output of an adder having a first input connected to the output of the first transformation module; and a second input connected to the output of the non-linear filter.

26. The device of claim 25, wherein first input of the adder is connected to the output of the first transformation module through a multiplexer that is capable of multiplexing the output of the first transformation module with a coefficient.

27. The device of claim 26, wherein second input of the adder is connected to the output of the non-linear filter through another multiplexer that is capable of multiplexing the output of the non-linear filter with another coefficient.

28. The device of claim 26, wherein each subtraction node has an output for outputting one of the transformed color image components.

29. The device of claim 26, wherein the non-linear function is a power law function.

30. A device for processing an image, comprising:
  an input for receiving a set of color components of the input image;
  a first transformation module for obtaining an intermediate value from the set of color components;

a non-linear filter in connection with first transformation module for transforming the intermediate value using a non-linear function;

a set of subtraction nodes connected to the inputs of the first transformation module and the output of the non-linear filter for subtracting a value proportional to the non-linearly transformed value from each individual input color image component; and a set of outputs for outputting a set of transformed color image components having the subtracted color image components;

wherein the set of transformed color image components comprises an additional color image component that is different from any one of the input color image components; and wherein the additional color image component is an output of an adder having a first input connected to the output of the first transformation module, a second input connected to the output of the non-linear filter, and a third input connected to the output of the set of subtraction nodes.

31. The device of claim 30, wherein first input of the adder is connected to the output of the first transformation module through a multiplexer that is capable of multiplexing the output of the first transformation module with a coefficient.

32. The device of claim 31, wherein second input of the adder is connected to the output of the non-linear filter through another multiplexer that is capable of multiplexing the output of the non-linear filter with another coefficient.

33. The device of claim 31, wherein each subtraction node has an output for outputting one of the transformed color image components.

34. The device of claim 31, wherein the non-linear function is a power law function.

* * * * *